United States Patent [19]

Wunderlich et al.

[11] Patent Number: 5,335,500
[45] Date of Patent: Aug. 9, 1994

[54] INTERNAL COMBUSTION ENGINE WITH COMBINED PRESSURE CHARGING

[75] Inventors: Klaus Wunderlich, Waiblingen; Franz Neubrand; Erwin Schmidt, both of Baltsmannsweiler; Hans-Wilhelm Buhl, Leinfelden-Echterdingen; Friedrich Wirbeleit, Esslingen-Rüdern; Horst Hanauer, Althütte, all of Fed. Rep. of Germany

[73] Assignee: Mercedes-Benz AG, Fed. Rep. of Germany

[21] Appl. No.: 34,712

[22] Filed: Mar. 19, 1993

[30] Foreign Application Priority Data

Mar. 27, 1992 [DE] Fed. Rep. of Germany ........ 4210070

[51] Int. Cl.$^5$ .............................................. F02B 33/44
[52] U.S. Cl. .................................. 60/609; 123/561
[58] Field of Search ............................ 60/609; 123/561

[56] References Cited

U.S. PATENT DOCUMENTS

| | | | |
|---|---|---|---|
| 3,270,730 | 11/1964 | Timoney | 123/561 |
| 3,712,280 | 1/1973 | Brille et al. | 60/609 |
| 4,730,457 | 3/1988 | Yamada et al. | 60/609 |
| 4,903,488 | 2/1990 | Shibata | 60/609 |
| 5,056,314 | 10/1991 | Paul et al. | 60/609 |

FOREIGN PATENT DOCUMENTS

| | | |
|---|---|---|
| 2052501 | 5/1971 | Fed. Rep. of Germany . |
| 3636642 | 4/1987 | Fed. Rep. of Germany . |
| 0275018 | 11/1990 | Japan ...................... 60/609 |

*Primary Examiner*—Richard A. Bertsch
*Assistant Examiner*—Charles G. Freay
*Attorney, Agent, or Firm*—Evenson, McKeown, Edwards & Lenahan

[57] ABSTRACT

An internal combustion engine with combined pressure charging has an exhaust turbocharger turbine arranged in an exhaust conduit of the internal combustion engine driving a compressor arranged in an intake conduit. A mechanically driven supercharger is arranged downstream of the compressor and is coupled continuously variably to the engine via a Föttinger speed transformer with variable-pitch guide vanes and variable speed slip. To bypass the mechanically driven supercharger, a bypass conduit is provided. A circulating-air slide is arranged in the bypass conduit for controlling the air quantity bypassing the mechanically driven supercharger. The degree of opening of the circulating-air slide and the slip of the Föttinger speed transformer are controlled as a function of operating parameters such that the charge-air pressure is adjusted to a predetermined set point value.

3 Claims, 1 Drawing Sheet

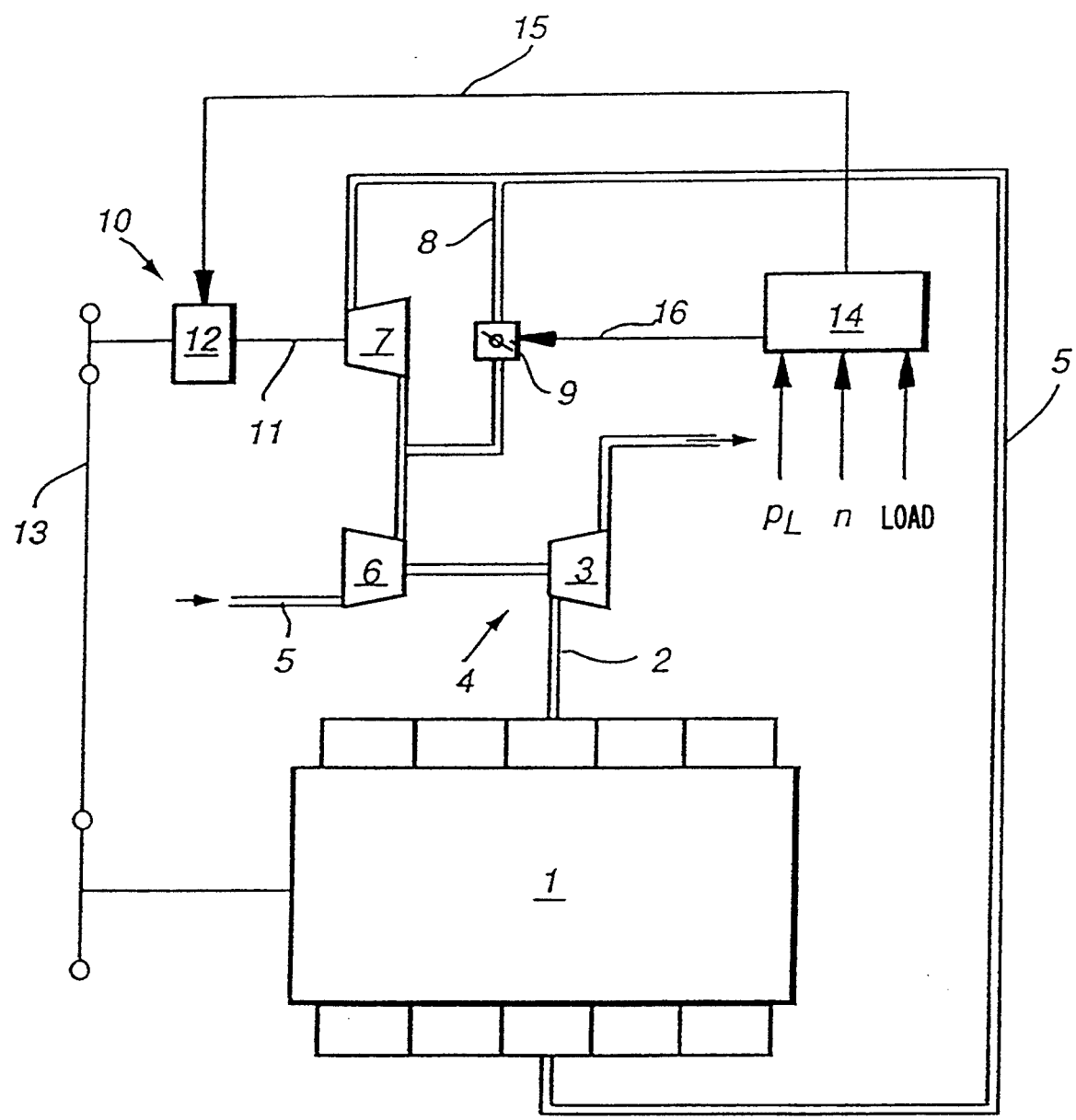

INTERNAL COMBUSTION ENGINE WITH COMBINED PRESSURE CHARGING

BACKGROUND AND SUMMARY OF THE INVENTION

The present invention relates to an internal combustion engine with combined pressure charging, and, more particularly, to an engine comprising a turbine acted upon by exhaust gas and operable to drive a compressor in an exhaust conduit of the engine, a mechanically-driven supercharger arranged downstream of the compressor in an intake conduit of the engine and connected to the engine via a coupling device, a bypass conduit bypassing the mechanically-driven supercharger, a bypass air flow control device arranged in the bypass conduit, a speed sensor for detecting engine speed, a load sensor for detecting engine load, a control device for controlling the coupling device the bypass air flow control device.

German Offenlegungsschrift No. 3,636,642 discloses a motor-vehicle engine having an exhaust turbocharger and a supercharger driven mechanically by the engine by a coupling device, and a bypass conduit which bypasses the mechanical supercharger provided with a bypass valve arranged therein. At high load and low engine speed, the mechanical supercharger is operated, with the bypass valve being closed. At high engine speed or at low engine speed and low engine load, the mechanical supercharger is stopped by disengagement of the coupling device. In the transitional range between the various operating states, the bypass valve is opened gradually as a function of operating parameters.

This known arrangement has the disadvantage that, due to the high inertia of the mechanical supercharger and its immediately commenced output, very high coupling torques are transmitted upon coupling the mechanical supercharger. These brief power peaks lead to overstressing of the separating clutch or necessitate a very large overall volume. Switching hysteresis thereby results, if, for example, starting from high engine speeds, after overrun operation, charging pressure is again required from the mechanical supercharger.

An object of the present invention is to provide a combined pressure charging internal combustion engine which guarantees as rapid and delay-free a response as possible to load changes of the engine in combination with a high efficiency in all operating ranges.

The foregoing object has been achieved according to the present invention by a pressure sensor for detecting charge-air pressure, wherein a coupling device has a speed-varying device via which a driving speed of the mechanically-driven supercharger transmitted to an engine drive shaft can be varied continuously between a maximum speed and a minimum speed, and the charge-air pressure is adjusted by the control device to a predetermined set point value as a function of the engine speed and the engine load via the bypass air flow control device and via the driving speed transmitted by the speed-varying device to the drive shaft coupled to the mechanically driven supercharger.

Since, in the case of an exhaust turbocharger, there is only gas-dynamic coupling to the internal combustion engine, the charging pressure produced falls sharply in low speed and load ranges. In the event of a jump to full load of the engine, there is a certain time lag in the charging-pressure build-up of the exhaust turbocharger. This leads to delayed engine response characteristics and, particularly in the case of diesel engines, to an increased particulate emission.

In the case of the mechanically driven supercharger, a sufficiently high charging pressure can be built up virtually without a delay, even in the low engine speed range, due to its permanent coupling to the internal combustion engine. The internal combustion engine has to provide the driving power to produce the charging pressure. This results in increasingly high specific fuel consumption figures as the charging pressure increases, compared with an engine pressure-charged via an exhaust turbocharger.

By way of combined pressure charging, a relatively high charging pressure can be achieved even at low engine speeds. Good acceleration characteristics of the engine can be achieved without excessive emission of particulates. The specific fuel consumption in the full-load and upper part-load range is more favorable. The downstream positioning of the mechanically driven supercharger furthermore improves the run-up behavior of the exhaust turbocharger since the air drawn in by the mechanically driven supercharger supplies kinetic energy, as input energy to the existing static pressure reduction in the compressor.

The use of a continuously variable coupling device offers the advantage that the mechanical loading of the continuously engaged mechanically driven supercharger is reduced by continuously high supercharger speeds in circulating-air mode as are its speed-dependent friction power and noise emission. In addition, it is thereby possible to optimize the charge-air pressure over the entire operating range and thus improve the efficiency of the engine.

The present invention offers the advantage that the mechanically driven supercharger can be run up to its operating speed at its lowest power consumption. It also guarantees that the mechanically driven supercharger is operated at its operating speed over as large an operating range as possible, with the result that the necessary charge-air pressure is immediately available, by closure of the bypass valve, in the event of a spontaneous load change.

To increase the engine braking effect, the mechanically driven supercharger is operated at its maximum speed and with the bypass valve closed in the overrunning mode of the engine. In addition, sufficient charging pressure is thus immediately available in the event of an abrupt transition to a load state.

By virtue of the special arrangement of the speed-varying device, the present invention has the lowest torque loading and the highest speed difference between the input and output of the speed-varying device.

BRIEF DESCRIPTION OF THE DRAWINGS

These and other objects, features and advantages of the present invention will become more apparent from the following detailed description thereof when taken in conjunction with the sole figure constituting a schematically shown internal combustion engine according to the invention.

DETAILED DESCRIPTION OF THE DRAWINGS

FIG. 1 shows an internal combustion engine 1 having a turbine 3 of an exhaust gas turbocharger designated generally by the numeral 4 arranged in the exhaust conduit 2 of the engine 1. The turbine 3 drives a compressor 6 arranged in an intake conduit 5 of the internal combustion engine 1. A mechanically driven supercharger 7 is provided in the intake conduit downstream of the compressor 6. Provided in a bypass conduit 8 bypassing the mechanically driven supercharger 7 is a bypass air flow control device 9 configured as a circulating-air slide to control the bypass air flow.

The mechanically driven supercharger 7 is coupled mechanically to the internal combustion engine 1 by a coupling element designated generally by numeral 10. The coupling element 10 comprises a common drive shaft 11, which connects the mechanically driven supercharger 7 and a speed-varying device 12 configured as a Föttinger speed transformer with variable-pitch guide vanes and variable slip s, and a power transmission element 13 configured as a belt drive which is connected mechanically to the internal combustion engine 1. The slip s of the Föttinger speed transformer 12 is defined as $s = 1 - n_{ab}/n_{an}$, where $n_{an}$ is the input speed transmitted from the belt drive 13 to the Föttinger speed transformer 12 and $n_{ab}$ is the output speed transmitted from the Föttinger speed transformer 12 to the drive shaft 11. The slip s of the Föttinger speed transformer 12 and the degree $\alpha$ of opening of the circulating-air slide 9 is controlled by a control device 14. The engine load L, the engine speed n and the charge-air pressure $p_L$ supplied to the internal combustion engine 1 are input variables to the control device 14. The slip s and degree $\alpha$ of opening of the circulating-air slide 9 are controlled by the control device 14 via control lines 15, 16 as a function of the input variables such that the measured charge-air pressure $p_L$, is adjusted to a set point value $P_{set}$ predetermined in the control device 14.

By way of the adjustable slip s of the Föttinger speed transformer 12, the output speed $n_{ab}$ of the Föttinger speed transformer 12 transmitted to the drive shaft 11 can be adjusted in continuously variable fashion, allowing the speed of the mechanically driven supercharger 7 to be set variably between a maximum speed $n_{max}$, dependent on the engine speed n and the transmission ratio of the belt drive 13, and a minimum speed $n_{min}$, for example $n_{min} = 0$, dependent on the slip s of the Föttinger transformer 12, with continuous drive train coupling.

The mechanically driven supercharger 7 is preferably configured as a positive-displacement supercharger. By virtue of the way in which they function, positive-displacement superchargers operate without internal compression, i.e. no increase in the pressure of the air takes place in the compressor. Instead, the air drawn in is displaced from the intake to the delivery side and only there compressed against the internal combustion engine 1, which acts as a restrictor. If the intake and delivery side are connected to one another via a bypass conduit 8, the driving energy taken up by the mechanical supercharger 7 corresponds approximately to its internal frictional losses.

If the internal combustion engine 1 is operated in the idling mode, the slip s of the Föttinger speed transformer 12 is set to $s \approx 0$, i.e. to the maximum speed $n_{max}$ of the mechanically driven supercharger 7. The circulating-air slide 9 is completely open and, as a result, frictional losses are essentially all that occur at the mechanically driven supercharger 7. In the event of an abrupt load increase, the circulating-air slide 9 is closed and sufficient charge-air pressure $p_L$, is thus immediately available.

As the engine speed n rises, the charge-air pressure is initially controlled by opening the circulating-air slide 9. Only with the circulating-air slide 9 completely open and with the charge-air pressure $p_L$ increasing due to the exhaust turbocharger 4 connected in series as the engine speed n rises further is the output speed $n_{ab}$ of the drive shaft 11 reduced at the Föttinger speed transformer 12 by an increase in the slip s and the speed of the mechanically driven supercharger 7 thereby lowered. This leads to a reduction in the mechanical loading on the internal combustion engine 1 and the mechanically driven supercharger 7.

Values up to $s = 1$ can be set for the slip, i.e. the speed of the drive shaft 11 is 0. The exhaust turbocharger 4 then delivers a charge-air pressure $p_L$. in accordance with its operating equilibrium.

Starting from a high engine speed n and with the engine speed n continuously falling, the circulating-air slide 9 initially remains completely open and the slip s is continuously reduced, down to $s \approx 0$. The mechanically driven supercharger 7 is thereby run up to its operating speed with a minimum of power consumption. As the engine speed n falls further, the necessary charge-air pressure $p_L$ is, due to the fact that the charge-air pressure $p_L$ at the exhaust turbocharger 4 is falling, compensated by continuously closing the circulating-air slide 9.

In overrun operation of the internal combustion engine 1, the exhaust turbocharger 4 produces only a low charge-air pressure $p_L$. Particularly in the case of a commercial-vehicle diesel engine with an exhaust flap or constant throttle, the engine braking effect can be considerably increased. This is achieved by the slip s at the Föttinger speed transformer 12 being set to $s \approx 0$ and the circulating-air slide 9 being closed. The mechanically driven supercharger 7 delivers additional charge air in accordance with its operating speed. The engine braking effect is additionally increased by the driving power absorbed by the mechanically driven supercharger 7. In addition, sufficient charge-air pressure $p_L$ is as a result immediately available in the event of an abrupt transition to operation under load.

In addition to the Föttinger speed transformer 12 with variable slip s described above, it is, of course, also possible to use an actuating gear with a continuously variable transmission ratio or a corresponding speed-varying device as the coupling device 10 between the internal combustion engine 1 and the mechanically driven supercharger 7. It is furthermore also possible to use a circulating-air valve instead of the circulating-air slide 9.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An internal combustion engine comprising a turbine acted upon by exhaust gas and operable to drive a compressor in an exhaust conduit of the engine, a mechanically-driven supercharger arranged downstream of the compressor in an intake conduit of the engine and connected to the engine via a coupling device, a bypass conduit bypassing the mechanically-driven supercharger, a bypass air flow control device arranged in the bypass conduit, a speed sensor for detecting engine speed, a load sensor for detecting engine load, a control device for controlling the coupling device and the bypass airflow control device, and a pressure sensor for detecting charge-air pressure, wherein the coupling device has a speed-varying device via which a driving speed of the mechanically-driven supercharger transmitted to an engine drive shaft can be varied continuously between a maximum speed and a minimum speed, and the charge-air pressure is adjusted by the control device to a predetermined set point value as a function of the engine speed and the engine load via the bypass air flow control device and via the driving speed transmitted by the speed-varying device from the drive shaft to the mechanically driven supercharger, wherein the control device is configured such that the drive speed of the mechanically-driven supercharger is increased only when the bypass air flow control device is completely open.

2. An internal combustion engine, comprising a turbine acted upon by exhaust gas and operable to drive a compressor in an exhaust conduit of the engine, a mechanically-driven supercharger arranged downstream of the compressor in an intake conduit of the engine and connected to the engine via a coupling device, a bypass conduit bypassing the mechanically-driven supercharger, a bypass air flow control device arrange din the bypass conduit, a speed sensor for detecting engine speed, a load sensor for detecting engine load, a control device for controlling the coupling device and the bypass air flow control device, and a pressure sensor for detecting charge-air pressure, wherein the coupling device has a speed-varying device via which a driving sped of the mechanically-driven supercharger transmitted to an engine drive shaft can be varied continuously between a maximum speed and a minimum speed, and the charge-air pressure is adjusted by the control device to a predetermined set point value as a function of the engine speed and the engine load via the bypass air flow control device and via the driving speed transmitted by the speed-varying device from the drive shaft to the mechanically driven supercharger, wherein the control device is configured such that, in order to reduce the power absorbed by the mechanically driven supercharger, the bypass air flow is first increased and, only when the bypass air flow control device is completely open, the drive speed of the mechanically-driven supercharger is reduced.

3. An internal combustion engine, comprising a turbine acted upon by exhaust gas and operable to drive a compressor in an exhaust conduit of the engine, a mechanically-driven supercharger arranged downstream of the compressor in an intake conduit of the engine and connected to the engine via coupling device, a bypass conduit bypassing the mechanically-driven supercharger, a bypass air flow control device arranged in the bypass conduit, a speed sensor for detecting engine speed, a load sensor for detecting engine load, a control device for controlling the coupling device and the bypass air flow control device, and a pressure sensor for detecting charge-air pressure, wherein the coupling device has a speed-varying device via which a driving speed of the mechanically-driven supercharger transmitted to an engine drive shaft can be varied continuously between a maximum speed and a minimum speed, and the charge-air pressure is adjusted by the control device to a predetermined set point value as a function of the engine speed and the engine load via the bypass air flow control device and via the driving speed transmitted by the speed-varying device from the drive shaft to the mechanically driven supercharger, wherein the control device is configured such that, in order to increase the output of the mechanically driven supercharger, the drive speed of the mechanically-driven supercharger is first increased and, only when the maximum speed is reached, the degree of opening of the bypass air flow control device is reduced.

* * * * *